(12) United States Patent
Hunter et al.

(10) Patent No.: US 7,577,915 B2
(45) Date of Patent: Aug. 18, 2009

(54) DYNAMIC RECONFIGURATION OF INPUTS BASED ON CONTEXTUAL FOCUS

(75) Inventors: Jim Hunter, San Jose, CA (US); Jon Rappaport, Matthews, NC (US)

(73) Assignee: 4HomeMedia, Inc., Sunnyvale, CA (US)

( * ) Notice: Subject to any disclaimer, the term of this patent is extended or adjusted under 35 U.S.C. 154(b) by 183 days.

(21) Appl. No.: 11/636,423

(22) Filed: Dec. 7, 2006

(65) Prior Publication Data

US 2007/0180427 A1 Aug. 2, 2007

Related U.S. Application Data

(63) Continuation-in-part of application No. 11/313,264, filed on Dec. 21, 2005, now abandoned, which is a continuation of application No. 10/093,674, filed on Mar. 8, 2002, now abandoned.

(51) Int. Cl.
G06F 3/00 (2006.01)
G06F 3/14 (2006.01)

(52) U.S. Cl. .................. 715/765; 715/767; 715/821; 715/835; 345/156

(58) Field of Classification Search ............ 715/733, 715/738, 744, 760, 764, 765, 767, 821, 822, 715/823, 835, 846; 709/203, 217, 219; 345/156, 345/157, 163, 168
See application file for complete search history.

(56) References Cited

U.S. PATENT DOCUMENTS

| | | | | |
|---|---|---|---|---|
| 2002/0171624 | A1* | 11/2002 | Stecyk et al. | 345/156 |
| 2003/0103088 | A1* | 6/2003 | Dresti et al. | 345/835 |
| 2003/0140107 | A1* | 7/2003 | Rezvani et al. | 709/208 |
| 2006/0007933 | A1* | 1/2006 | Maxson et al. | 370/392 |

* cited by examiner

Primary Examiner—X. L Bautista
(74) Attorney, Agent, or Firm—Brian N. Young; Trellis IP Law Group, PC

(57) ABSTRACT

In one embodiment, a focus on an focus item associated with a controllable item is determined. For example, the focus may be moving a pointer over an focus item displayed on a display. One or more functional actions for the controllable item are then determined based on the focus being on the focus item. For example, if the controllable item is a camera and the focus is on an icon for the camera, then one or more functional actions for the camera are determined. The one or more functional actions are then assigned to one or more inputs on a input device. The input device can now be used to perform the one or more functional actions by using the one or more inputs. For example, the user may select one of the inputs, which sends signals to a processing device. The processing device can then determine the functional action assigned to the input and cause the action to be performed with the controllable item.

24 Claims, 5 Drawing Sheets

US 7,577,915 B2

DYNAMIC RECONFIGURATION OF INPUTS BASED ON CONTEXTUAL FOCUS

CROSS REFERENCES TO RELATED APPLICATIONS

This application is a continuation in part of U.S. patent application Ser. No. 11/313,264, entitled "Dynamic Software Control Interface and Method", filed Dec. 21, 2005, which is a continuation of U.S. patent Ser. No. 10/093,674 (hereinafter "Dynamic Software Control Interface Patent Application") filed on Mar. 8, 2002, both of which are incorporated by reference in their entirety for all purposes.

BACKGROUND

Particular embodiments generally relate to controlling items and more specifically to reconfiguring functional actions for an input device based on a focus on a focus item associated with a controllable item.

Many different items may be controlled automatically using an input device. For example, a television, DVD player, and other electronic devices may each have their own input device. Additionally, as automation of other items not normally controlled by input devices becomes more popular, such as the control of lights, household appliances, cameras, etc., additional input devices may be needed. Accordingly, a user may need many input devices to control various items. This becomes hard to manage as carrying around all the input devices is unrealistic. Further, the different functions and layouts for the different input devices may be confusing and make it harder for a user to use the various input devices.

SUMMARY

Particular embodiments generally relate to configuring functional actions for an input device. In one embodiment, a focus on a focus item associated with a controllable item is determined. "Focus" can be determined from any context, such as from one or more objects, controls, display or screen areas, or other items, to which a user is paying attention, or is desired to pay attention. Focus can be determined or assumed based on detecting that a user's attention is directed toward, or has changed to, an item. For example, the focus may be determined by detecting movement of a pointer over a focus item displayed on a display. One or more functional actions for the controllable item are then determined based on the focus being on the focus item. For example, if the controllable item is a camera and the focus is on an icon for the camera, then one or more functional actions for the camera are determined. The one or more functional actions are then assigned to one or more inputs on an input device. The input device can now be used to perform the one or more functional actions by using the one or more inputs. For example, the user may select one of the inputs, which sends signals to a processing device. The processing device can then determine the functional action assigned to the input and cause the action to be performed with the controllable item.

When the focus is changed to a second focus item associated with a second controllable item, one or more functional actions for the second controllable item may be determined based on the focus being on the second focus item. The second one or more functional actions are then assigned to the one or more inputs on the input device. Thus, the one or more inputs may be used to perform the second one or more functional actions to control the second controllable item. Thus, the one or more inputs are reconfigured with a different set of functional actions based on the focus being on the first focus item or the second focus item.

A further understanding of the nature and the advantages of particular embodiments disclosed herein may be realized by reference of the remaining portions of the specification and the attached drawings.

DETAILED DESCRIPTION OF EMBODIMENTS

Figure 1:
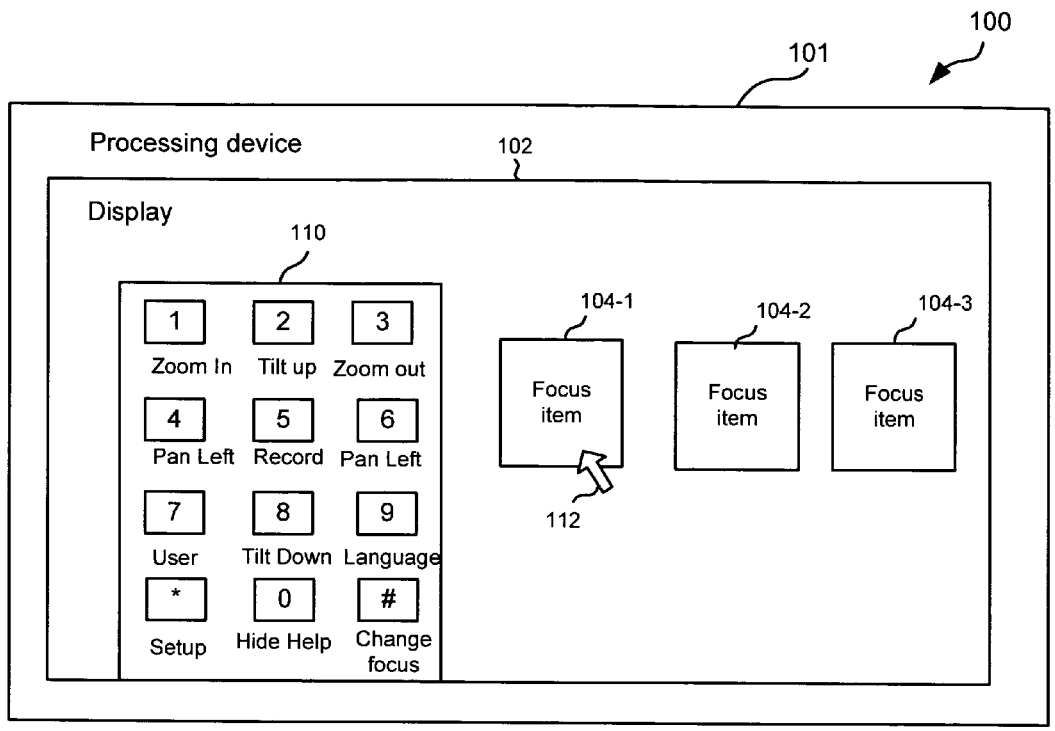
FIG. 1 depicts a simplified system for configuring functional actions of an input device according to one embodiment of the present invention.
Figure 1:
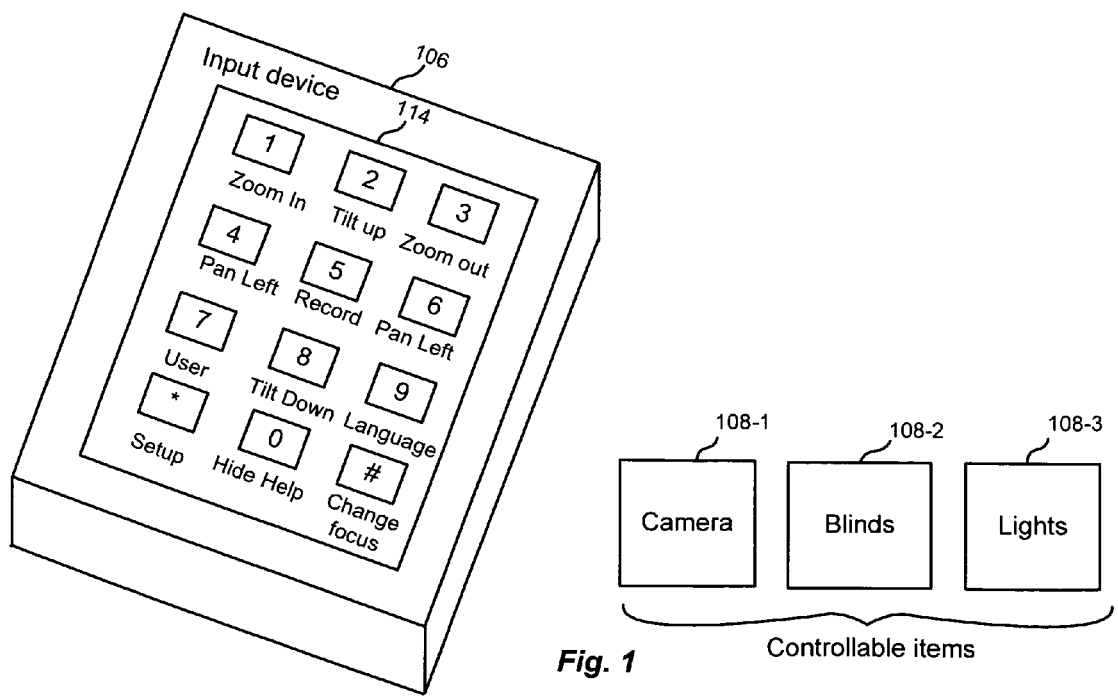

FIG. 1 depicts a simplified system 100 for configuring functional actions of an input device according to one embodiment of the present invention. As shown, a processing device 101 includes a display 102, input device 106, and controllable items 108. Display 102 also shows focus items 104 and an input device image 110.

Display 102 may be any display device, such as a monitor, television, LCD screen, etc. Display 102 may be part of any processing device 101. For example, the display 102 may be part of a laptop computer, desktop computer, personal digital assistant (PDA), cellular telephone, smart phone, etc.

Display 102 displays focus items 104. Focus items 104 may include information, such as text, video, images, animation, etc. For example, focus items 104 may be an icon on a screen. However, focus items 104 are not limited to being displayed on display 102. For example, an item may be a concept or event. For example, a scene in a movie may trigger focus when the scene occurs, playing of a song, movement of input device 106, etc.

Focus items 104 may be associated with various controllable items. For example, focus item 104-1 may be associated with controllable item 108-1, focus item 104-2 is associated with controllable item 108-2, and focus item 104-3 is associated with controllable item 108-3. Focus items 104 may visually indicate which controllable items 108 they are associated with. For example, an icon for focus item 104-1 may show a picture of a lab camera and also include the text "lab camera" such that a user can recognize that focus item 104 is associated with it.

Input device 106 may be any device that can be used to send signals to processing device 101 based on inputs 114 that are selected. For example, input device 106 may include a remote control, such as a universal remote, a remote with an input pad; a cellular phone; a laptop computer; a personal digital assistant (PDA); etc. Input device 106 may also include a virtual device, such as an application.

Processing device 101 may, itself, be a part of, or integral with, input device 106. Also, signals need not be sent directly from input device 106 to processing device 101 but can pass via one or more intermediary or other devices. In general, any manner of achieving functionality described herein may be used with different embodiments of the invention. For example, the order, timing, and physical location of performing steps, tasks, or processes can be modified. Distributed, parallel, or other suitable processing techniques can be used.

Input device 106 may allow users to select inputs 114. Inputs 114 may include any input device or method, such as buttons, a touch screen, thumb wheel, audio prompts, etc. Input device 106 may be a universal input device or may be an input device that is associated with a specific device 108. For example, input device 106 may be associated with lab camera 108-1 but may be used to control office blinds 108-2 and light 108-3.

Controllable items 108 may be any devices that are physical or virtual. For example, as shown, controllable item 108 is a lab camera, device 108-2 is office blinds, and 108-3 is a light. The devices shown are physical devices but it will be understood that virtual devices may also be controlled. Examples of virtual devices include applications, content, music, content feeds, etc.

Particular embodiments reconfigure inputs 114 to perform one or more functional actions based on a focus. Focus may be determined from any context, such as any determination that there is an interest in a focus item 114. For example, focus may be determined based on a user's actions with focus items 114 on display 102. In one embodiment, the focus may be determined based on a pointer 112 on display 102. For example, pointer 112 may be a mouse pointer and may be moved over focus item 114 or used to select focus item 114. Focus can occur when pointer rollover (i.e., "mouseover") on the focus item occurs, when the pointer is sufficiently close to the focus item, when the user actually selects (e.g., clicks on) the focus item, etc. If a touch-screen is used, the focus may be determined by a user touching the area around focus item 104 in focus item 104. Also, a shortcut key, or any other indication that the focus should be on a focus item 104.

Also, the focus may be determined in other ways, such as focus is determined based on an event that occurs. For example, input device 101 may be pointed at controllable items 108 themselves. Optical recognition, codes, etc. may be used to determine which controllable item 108 input device 106 is focused on. Further, an event that occurs may trigger focus. For example, a scene in a movie may trigger focus when it is played on a media player. Other examples include detecting a phrase in close captioning for a media show, proximity to a device (e.g., input device 101 is brought closer to focus item 104), etc. Also, dynamic events that occur and can be detected through a network may be used to trigger focus.

When the focus on a focus item 104 is detected, one or more functional actions for a controllable item 108 associated with focus item 104 are determined. For example, each controllable item 108 may have its own set of functional actions. Although different sets of functional actions are described, it will be understood that some action may be overlap among controllable items 108. For example, the same functional actions may be performed for different controllable items 108.

The functional actions are assigned to the inputs 114 of the input device 106. Thus, when an input from input device 106 is received, the functional action that was assigned to that input 114 may be performed.

As shown, an input device image 110 may be provided. This may help a user determine which functional actions are associated with which inputs 114 for input device 106. Input device image 110 may be displayed in different places. For example, input device image 110 may be displayed in different areas of display 102. Also, input device image 110 may be displayed on different devices, such as on As shown in FIG. 1, the focus is on focus item 104-1, which corresponds to controllable item 108-1. In this case, one or more functional actions are shown in input device image 110. These are actions that may be performed with the lab camera, such as zoom in, tilt up, zoom out, pan left, record, pan right, etc. These are shown in association with inputs 114 that are found on input device 106 such that a user may easily determine which inputs 114 to use to perform a desired functional action.

Accordingly, if the user presses the input "1" on input device 106, then the lab camera is zoomed in. This may be shown on display 102. For example, the display of focus item 104 may be expanded to show an image of what the lab camera is recording. When the zoom in button is selected, the lab camera zooms in. This process will be described in more detail below.

In one example, a user may be controlling various items 108 through a web interface on display 102. Focus items 104 may show various controllable items 108. In one embodiment, a user may be remote from item 108. When the user wants to control a controllable item 108, focus is shifted to a focus item 104 associated with controllable item 108. For example, pointer 112 is moved to select or be substantially over focus item 104. When this happens, input device 106 is reconfigured with the functional actions associated with focus item 104 and controllable item 108. A user may then perform the functional actions using input device 106. These actions are then performed by device 108 that is in a remote location. Accordingly, a user may control devices 108 remotely using input device 106.

Also, user preferences or other rules may be used to alter any of the steps provided above. For example, user preferences are used to determine which functional actions are determined. For example, a user may prefer certain functional action for a controllable item 108. Further, a user may prefer a certain layout for the actions on input device 106.

Other preferences may also be applied to focus items 104, controllable items 108, and input devices 106. For example, available focus items 104 may be different for different users. Different users may only be able to control certain controllable items 108. Thus, different rights may be assigned to different users.

The focus may also be controlled by user preferences. For example, a user may want focus to be determined when a certain movie is playing, may want focus to be determined when a pointer is within a certain distance of focus item 104, etc.

Input device 106 may also be dynamically reconfigured. As the focus is changed, the above steps may be performed again to reassign functional actions to inputs 114 for input device 106. Once they are reassigned, user may use input device 106 to perform functional actions using the same inputs 114. Accordingly, dynamic reconfiguration of input device 106 based on the focus on focus items 104 is provided.

Figure 2:
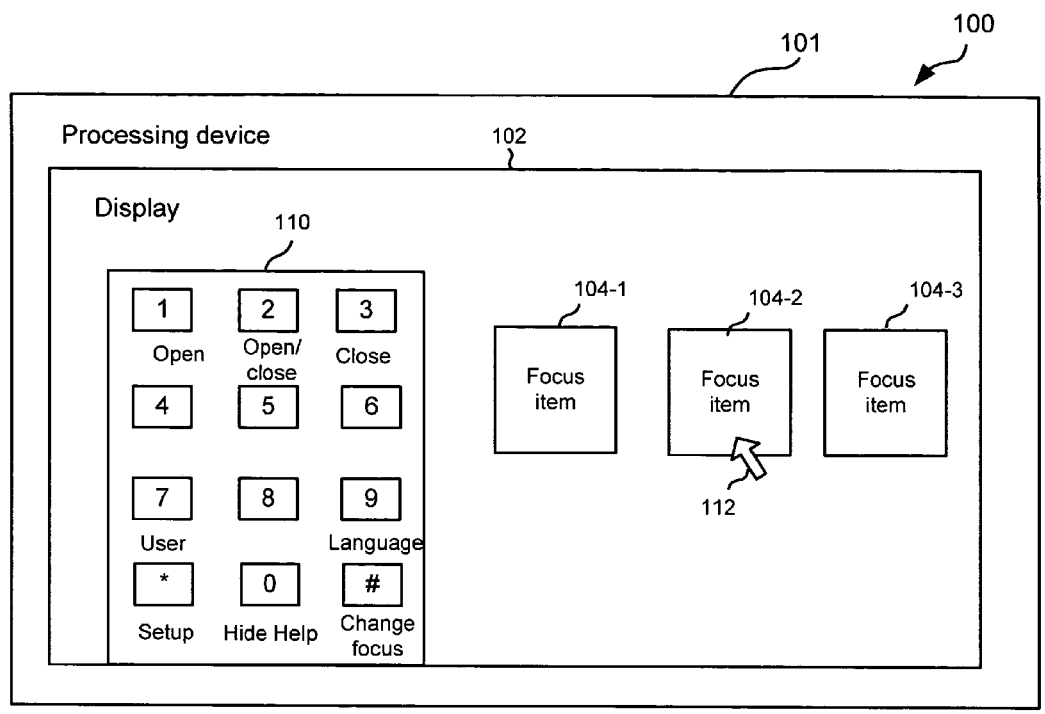
FIG. 2 depicts another example of a display with a different focus according to one embodiment of the present invention.
Figure 2:
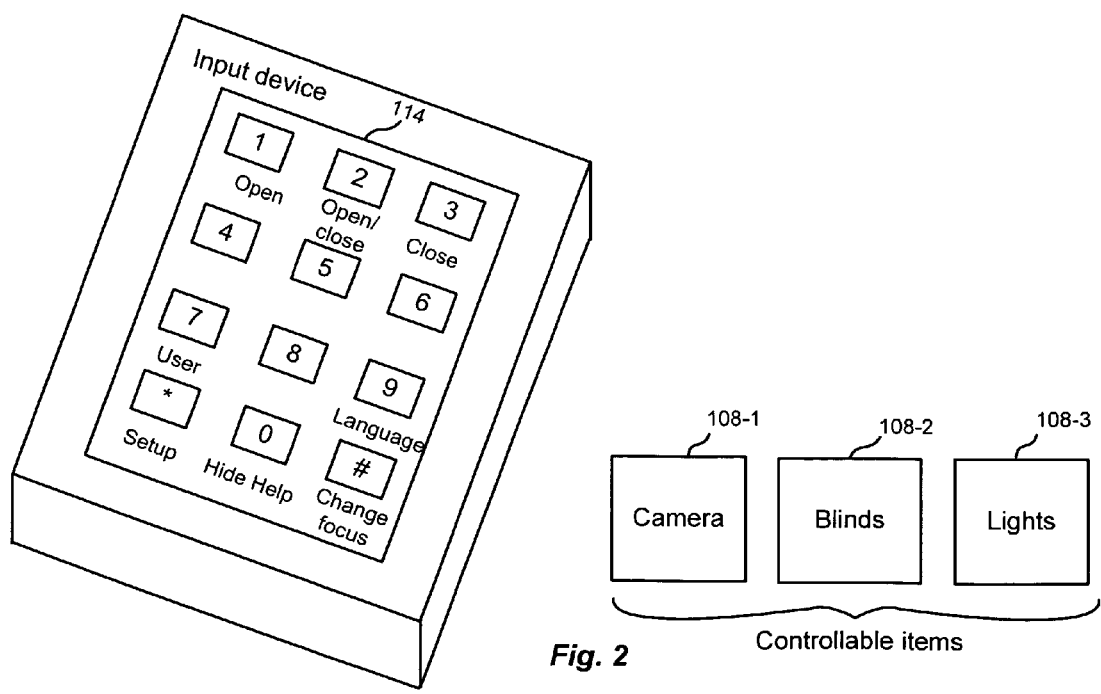

FIG. 2 depicts another example of a display 102 with a different focus according to one embodiment of the present invention. As shown, pointer 112 has been moved to focus item 104-2. This changes the focus to focus item 104-2. Although this method of changing the focus is described, it will be understood that other methods will be appreciated. For example, a selection of focus item 104-2 may be received through a touch screen, shortcut key, detection of an event, etc. An input 114 on input device 106 may also be used to change the focus to focus item 104-2.

When the focus is changed to focus item 104-2, a new set of functional actions are determined for controllable item 108-2. In this example, these are the one or more functional actions are actions that can be performed for the office blinds.

These functional actions may also be shown in input device image 110 when the focus is shifted. As shown, these functions include Open, Open/Close, Close, etc. Accordingly, when an input 114 is received from input device 106, one of these functions is determined and performed. For example, if the number "1" input is received from input device 106, then the function of lowering the blinds is performed. This is different than the function of zooming in that was performed when the focus was on focus item 104-1. Accordingly, reassigning of the inputs 114 on input device 106 has been performed based on the focus on display 102.

Thus, input device 106 may be used to control multiple devices 108. Inputs 114 may be reconfigured to perform different functional actions based on where the focus is determined. Accordingly, users may use the same input device 106 to control multiple devices 108. Because the layout of inputs 114 remain the same but the functional actions change, the use of the input device is familiar to a user. For example, the user can use the same number keypad to perform different functional actions with different controllable items 108. Thus, user does not need to learn where different buttons are for different functional actions for various controllable items 108. This is very convenient for a user. All the user may have to do is look at input device image 110 to determine the different functional actions for inputs 114. Additionally, user may memorize the different functional actions for inputs 114 for various controllable items 108. Because the number keypad stays the same, it may be easier for a user to perform these actions rather than learn different layouts for multiple input devices. All user has to do is change the focus on focus items 104 to invoke the different functional actions for different controllable items 108.

Figure 3:
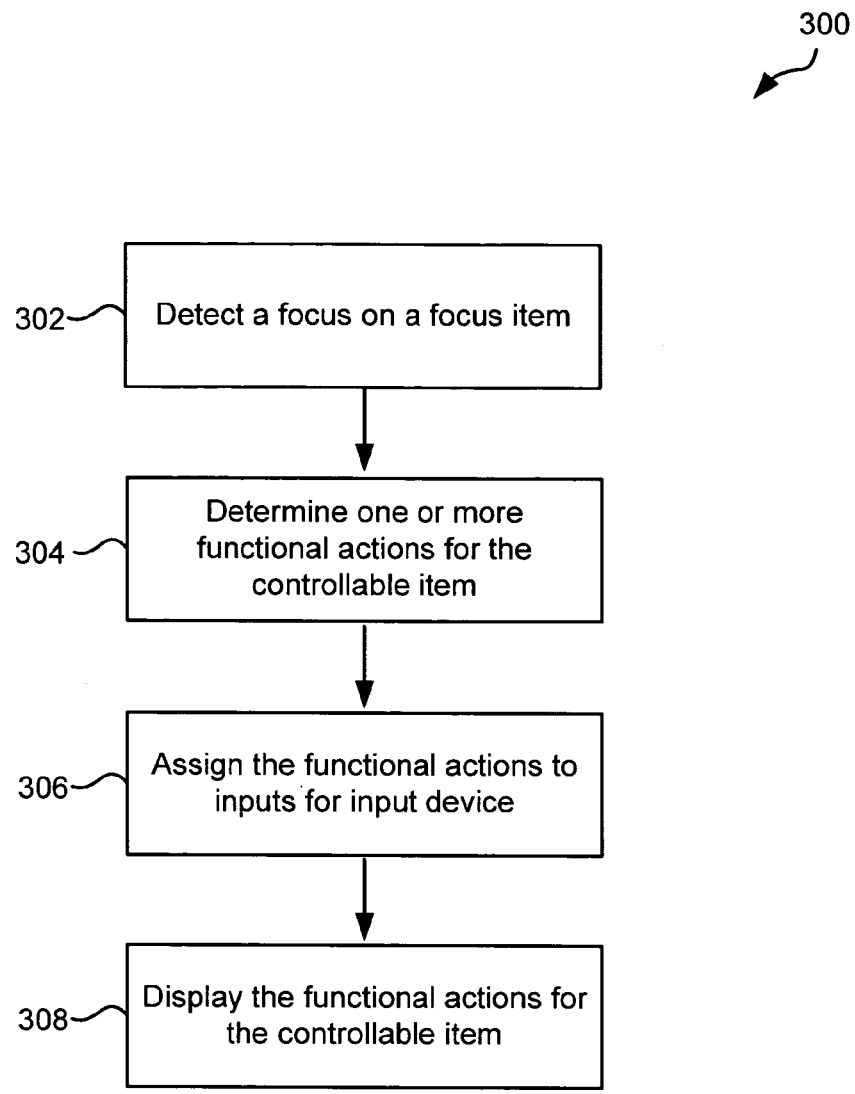
FIG. 3 depicts a simplified flowchart of a method for configuring an input device according to one embodiment of the present invention.

FIG. 3 depicts a simplified flowchart 300 of a method for reconfiguring input device 106 according to one embodiment of the present invention. Step 302 detects a focus on a focus item 104. For example, when a mouse pointer is moved over focus item 104 on display 102 it is determined that the focus is on that focus item 104.

Step 304 determines one or more functional actions for focus item 104. The one or more functional actions are associated with a controllable item 108.

Step 306 assigns the functional actions to inputs 114 for input device 106. For example, the functional actions are assigned such that input device 106 can be used to perform the actions by selecting one of the inputs 114.

Step 308 displays the functional actions for the controllable item 108. In one embodiment, the functional actions may be displayed on input device image 110. Also, the functional actions may be displayed on input device 106. If input device 106 includes a display, then the functional actions may be displayed on the display. For example, the text describing each action may be displayed for each input 114 on input device 106.

Figure 4:
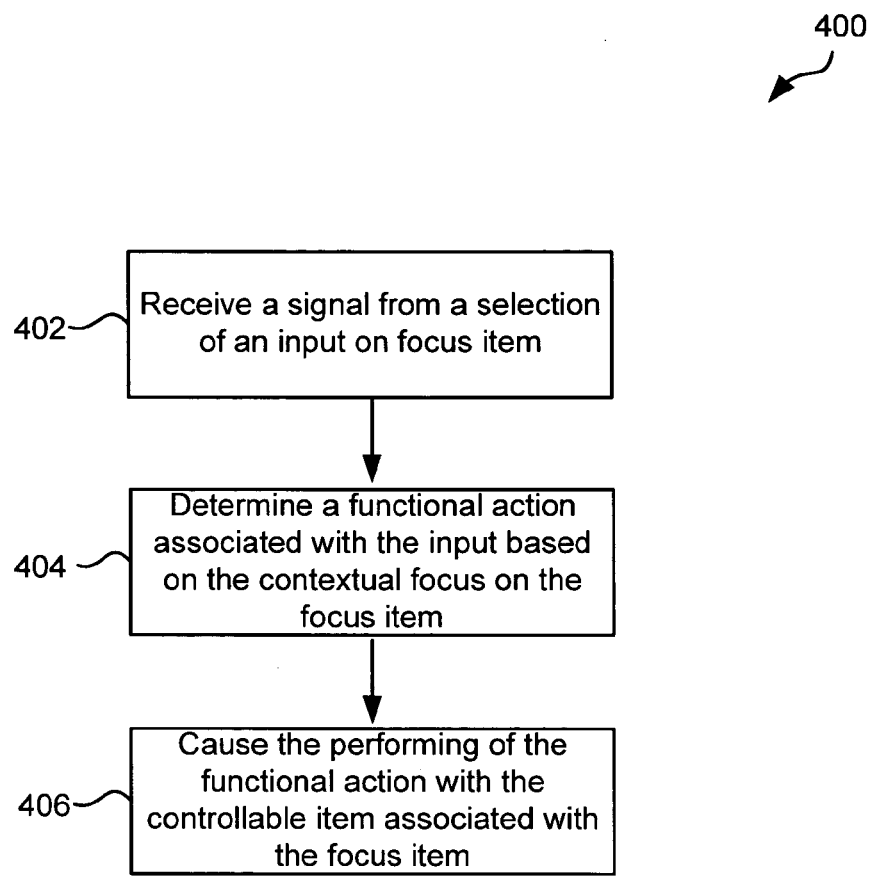
FIG. 4 depicts a simplified flowchart of a method for performing actions based on inputs received from the input device according to one embodiment of the present invention.

Input device 106 can then be used to perform actions. FIG. 4 depicts a simplified flowchart 400 of a method for performing actions based on inputs received from input device 106 according to one embodiment of the present invention. Step 402 receives a signal from a selection of an input 114 on input device 106. The signal may be received through any communication medium, such as a wireless medium or wire line medium. For example, input device 106 may use infrared to send a signal to processing device 101. Although not shown, it will be understood that other devices may process the signal and perform the following steps. For example, controllable item 108, a router, etc. may process the signal. Thus, processing device 101 does not have to receive and process the signal. However, for discussion purposes, however, it is assumed processing device 101 processes the signal and performs the following steps.

Step 404 determines a functional action associated with the input 114 based on the contextual focus on focus item 104. For example, processing device 101 determines which functional action was assigned to input 114. This is done based on which focus item 104 the focus is on.

Step 406 causes the performing of the functional action with controllable item 108 associated with focus item 104. For example, processing device 101 may communicate with controllable item 108 to cause the action to be performed.

The above process described in FIGS. 3 and 4 may be performed every time focus is changed. For example, input device 106 can be dynamically reconfigured to perform different actions based on the focus.

Figure 5:
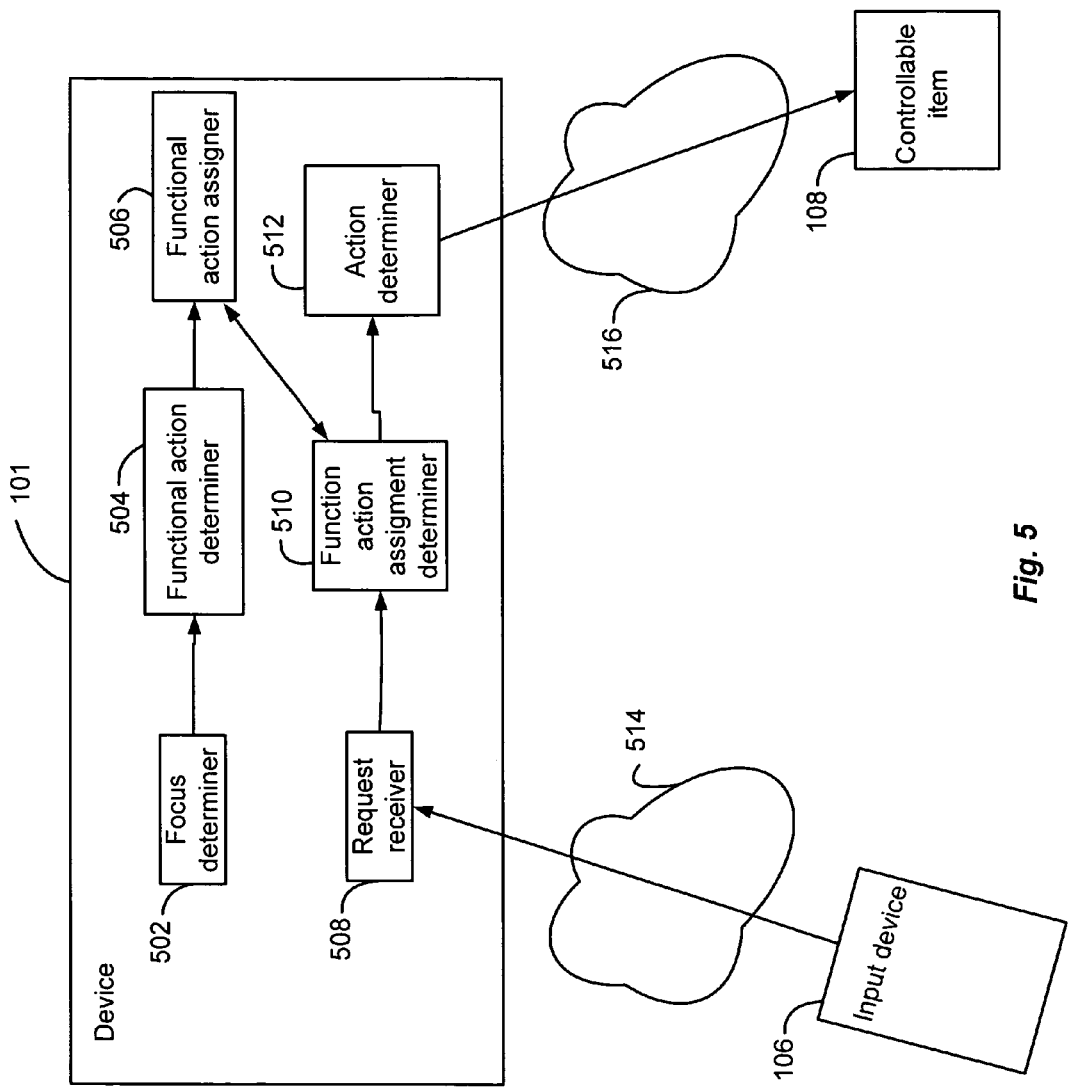
FIG. 5 shows a more detailed embodiment of a processing device according to embodiments of the present invention.

FIG. 5 shows a more detailed embodiment of processing device 101 according to embodiments of the present invention. As shown, processing device 101 includes a focus determiner 502, a functional action determiner 504, a functional action assigner 506, an input receiver 508, a functional action assignment determiner 510, and a functional action performer 512.

Focus determiner 502 is configured to determine which focus item the focus is on. For example, focus determiner 502 determines when pointer 112 is focused on a focus item 104.

Functional action determiner 405 then determines the functional actions associated with focus item 104. This may be determined based on a table that assigns functional actions for a controllable item 108.

Functional action assigner 506 then assigns the functions to inputs 114 on input device 106. In assigning the functional actions, the functional actions may be displayed on input device image 110 and/or input device 106. This allows a user to see which functional actions have been assigned to which inputs 114.

Once the functional actions have been assigned, then a user may use input device 106 to perform them. In one embodiment, an interface may be dynamically generated for input device 106. The interface may include the inputs for the functional actions that have been assigned. In one embodiment, techniques described in the Dynamic Software Control Interface Patent Application may be used to dynamic generate the interface. For example, a user may select various inputs 114 on input device 106. This may send signals through a communication medium 514 to processing device 101. Although it is described that processing device 101 receives the signal, it will be understood that any other device may receive the signals and perform the following actions.

Communication medium 514 may be any communication medium, such as a wireless or wire line medium. In one embodiment, medium 514 is a wireless medium where infrared signals may be sent to processing device 101. In other embodiments, input device 106 may communicate with a computing device which then sends the signals across the Internet to processing device 101.

When input receiver 506 receives the signals for an input, it determines which input is received. Functional action assignment determiner 510 then determines the action associated with that input 114. For example, the functional actions that were assigned previously were based on the focus on focus item 104. The appropriate action is then determined for that focus item 104 to control device 108.

Action performer 512 is then configured to cause performance of the action. For example, action performer 512 may communicate across a communication medium 516 to controllable item 108. In one embodiment, communication medium 516 may be a wireless or wire line medium. Controllable item 108 then performs the action based on the signals received from action performer 512. In one embodiment, techniques described in the Dynamic Software Control Interface Patent Application may be used to send signals to control items 108.

Although the description has been described with respect to particular embodiments thereof, these particular embodiments are merely illustrative, and not restrictive. For example, although contextual focus is determined from a display screen, it will be understood that focus may be determined in other ways, such as by focusing on the controllable focus item itself.

Any suitable programming language can be used to implement the routines of particular embodiments including C, C++, Java, assembly language, etc. Different programming techniques can be employed such as procedural or focus item oriented. The routines can execute on a single processing device or multiple processors. Although the steps, operations, or computations may be presented in a specific order, this order may be changed in different particular embodiments. In some particular embodiments, multiple steps shown as sequential in this specification can be performed at the same time. The sequence of operations described herein can be interrupted, suspended, or otherwise controlled by another process, such as an operating system, kernel, etc. The routines can operate in an operating system environment or as standalone routines occupying all, or a substantial part, of the system processing. Functions can be performed in hardware, software, or a combination of both. Unless otherwise stated, functions may also be performed manually, in whole or in part.

In the description herein, numerous specific details are provided, such as examples of components and/or methods, to provide a thorough understanding of particular embodiments. One skilled in the relevant art will recognize, however, that a particular embodiment can be practiced without one or more of the specific details, or with other apparatus, systems, assemblies, methods, components, materials, parts, and/or the like. In other instances, well-known structures, materials, or operations are not specifically shown or described in detail to avoid obscuring aspects of particular embodiments.

A "computer-readable medium" for purposes of embodiments of the present invention may be any medium that can contain and store the program for use by or in connection with the instruction execution system, apparatus, system, or device. The computer readable medium can be, by way of example only but not by limitation, a semiconductor system, apparatus, system, device, or computer memory.

Particular embodiments can be implemented in the form of control logic in software or hardware or a combination of both. The control logic, when executed by one or more processors, may be operable to perform that what is described in particular embodiments.

A "processor" or "process" includes any hardware and/or software system, mechanism or component that processes data, signals or other information. A processor can include a system with a general-purpose central processing unit, multiple processing units, dedicated circuitry for achieving functionality, or other systems. Processing need not be limited to a geographic location, or have temporal limitations. For example, a processor can perform its functions in "real time," "offline," in a "batch mode," etc. Portions of processing can be performed at different times and at different locations, by different (or the same) processing systems.

Reference throughout this specification to "one embodiment", "an embodiment", "a specific embodiment", or "particular embodiment" means that a particular feature, structure, or characteristic described in connection with the particular embodiment is included in at least one embodiment and not necessarily in all particular embodiments. Thus, respective appearances of the phrases "in a particular embodiment", "in an embodiment", or "in a specific embodiment" in various places throughout this specification are not necessarily referring to the same embodiment. Furthermore, the particular features, structures, or characteristics of any specific embodiment may be combined in any suitable manner with one or more other particular embodiments. It is to be understood that other variations and modifications of the particular embodiments described and illustrated herein are possible in light of the teachings herein and are to be considered as part of the spirit and scope.

Particular embodiments may be implemented by using a programmed general purpose digital computer, by using application specific integrated circuits, programmable logic devices, field programmable gate arrays, optical, chemical, biological, quantum or nanoengineered systems, components and mechanisms may be used. In general, the functions of particular embodiments can be achieved by any means as is known in the art. Distributed, networked systems, components, and/or circuits can be used. Communication, or transfer, of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope to implement a program or code that can be stored in a machine-readable medium to permit a computer to perform any of the methods described above.

Additionally, any signal arrows in the drawings/Figures should be considered only as exemplary, and not limiting, unless otherwise specifically noted. Furthermore, the term "or" as used herein is generally intended to mean "and/or" unless otherwise indicated. Combinations of components or steps will also be considered as being noted, where terminology is foreseen as rendering the ability to separate or combine is unclear.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The foregoing description of illustrated particular embodiments, including what is described in the Abstract, is not intended to be exhaustive or to limit the invention to the precise forms disclosed herein. While specific particular embodiments of, and examples for, the invention are described herein for illustrative purposes only, various equivalent modifications are possible within the spirit and scope, as those skilled in the relevant art will recognize and appreciate. As indicated, these modifications may be made to the present invention in light of the foregoing description of illustrated particular embodiments and are to be included within the spirit and scope.

Thus, while the present invention has been described herein with reference to particular embodiments thereof, a latitude of modification, various changes and substitutions are intended in the foregoing disclosures, and it will be appreciated that in some instances some features of particular embodiments will be employed without a corresponding use of other features without departing from the scope and spirit as set forth. Therefore, many modifications may be made to adapt a particular situation or material to the essential scope and spirit. It is intended that the invention not be limited to the particular terms used in following claims and/or to the particular embodiment disclosed as the best mode contemplated for carrying out this invention, but that the invention will include any and all particular embodiments and equivalents falling within the scope of the appended claims.

We claim:

1. A method for configuring functional actions of an input device, the method comprising:
    determining a focus on a focus item associated with a controllable item;
    determining one or more functional actions for the controllable item based on the focus being on the focus item; and
    assigning the one or more functional actions to one or more inputs on the input device such that the input device can be used to perform the one or more functional actions using the one or more inputs to control the controllable item, wherein the one or more inputs on the input device are dynamically reassigned to the one or more functional actions from one or more previous functional actions that are associated with a previous controllable item.

2. The method of claim 1, further comprising displaying information for the one or more functional actions and the assigned one or more inputs.

3. The method of claim 2, wherein the information shows the one or more inputs on the input device and the assigned one or more functional actions.

4. The method of claim 1, further comprising:
    receiving a signal indicating an input that is selected;
    determining a functional action associated with the input; and
    causing performing of the functional action assigned to the input.

5. The method of claim 1, further comprising:
    determining a second focus on a second focus item associated with a second controllable item;
    determining one or more second functional actions for the second controllable item based on the focus being on the second focus item; and
    dynamically reassigning the one or more second functional actions to the one or more inputs on the input device such that the input device can be used to perform the one or more second functional actions using the one or more inputs to control the second controllable item.

6. The method of claim 1, wherein determining the focus comprises determining the focus is on the focus item being displayed on a display screen.

7. The method of claim 6, wherein determining focus is on the focus item comprises determining an input that is received indicating focus is on the focus item being displayed on the display screen.

8. The method of claim 1, wherein the focus item is the controllable item, the method further comprising:
    detecting when the input device is pointed at the controllable item, wherein focus is determined when the input device is pointed at the controllable item, wherein the one or more functional actions are assigned to one or more inputs based on the determination of focus based on the input device being pointed at the controllable item.

9. The method of claim 1, wherein the controllable item comprises a physical or virtual item.

10. The method of claim 1, wherein user preferences are used in determining the focus is on the focus item, the one or more functional actions, and/or in assigning the one or more functional actions to one or more inputs.

11. The method of claim 1, wherein the one or more functional actions are assigned to a numeric keyboard for the one or more inputs, wherein a number on the numeric keyboard is assigned different functions for the controllable item and the previous controllable item.

12. The method of claim 1, wherein the focus is determined using a plurality of contexts that detect the focus on the focus item in different ways.

13. The method of claim 12, wherein the plurality of contexts comprise a first context that detects focus on a display and a second context that detects focus on an event not on the display.

14. An apparatus configured to manage functional actions of an input device, the apparatus comprising:
    a focus determiner configured to determine a focus on a focus item associated with a controllable item;
    an action determiner configured to determine one or more functional actions for the controllable item based on the focus being on the focus item; and
    an action assigner configured to assign the one or more functional actions to one or more inputs on the input device such that the input device can be used to perform the one or more functional actions using the one or more inputs to control the controllable item, wherein the one or more inputs on the input device are dynamically reassigned to the one or more functional actions from one or more previous functional actions that are associated with a previous controllable item.

15. The apparatus of claim 14, wherein the action assigner is configured to display information for the one or more functional actions and the assigned one or more inputs.

16. The apparatus of claim 15, wherein the information shows the one or more inputs on the input device and the assigned one or more functional actions.

17. The apparatus of claim 14, further comprising:
    a request receiver configured to receive a signal indicating an input that is selected;
    an action assignment determiner configured to determine a functional action associated with the input; and
    an action performer configured to cause performing of the functional action assigned to the input.

18. The apparatus of claim 14,
    wherein the focus determiner is configured to determine a second focus on a second focus item associated with a second controllable item;
    wherein the action determiner is configured to determine one or more second functional actions for the second controllable item based on the focus being on the second focus item; and
    wherein the action assigner is configured to dynamically reassign the one or more second functional actions to the one or more inputs on the input device such that the input device can be used to perform the one or more second functional actions using the one or more inputs to control the second controllable item.

19. The apparatus of claim 14, wherein the focus determiner is configured to determine the focus is on the focus item being displayed on a display screen.

20. The apparatus of claim 19, wherein the focus determiner is configured to determine the focus is on the focus item when an input that is received indicating focus is on the focus item being displayed on the display screen.

21. The apparatus of claim 14, wherein the focus item is the controllable item, wherein the focus determiner is configured to detect when the input device is pointed at the controllable item, wherein focus is determined when the input device is pointed at the controllable item, wherein the one or more functional actions are assigned to one or more inputs based on the determination of focus based on the input device being pointed at the controllable item.

22. The apparatus of claim 14, wherein the controllable item comprises a physical or virtual item.

23. The apparatus of claim 14, wherein user preferences are used in determining the focus is on the focus item, the one or more functional actions, and/or in assigning the one or more functional actions to one or more inputs.

24. The apparatus of claim 14, wherein the one or more functional actions are assigned to a numeric keyboard for the one or more inputs, wherein a number on the numeric keyboard is assigned different functions for the controllable item and the previous controllable item.

* * * * *